(12) United States Patent
van Wijngaarden et al.

(10) Patent No.: US 7,395,914 B2
(45) Date of Patent: Jul. 8, 2008

(54) CARRIER FOR SORTING APPARATUS

(75) Inventors: Erik van Wijngaarden, Hengelo (NL); Wouter van den Berg, Voorburg (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 10/574,221

(22) PCT Filed: Oct. 7, 2004

(86) PCT No.: PCT/NL2004/000704

§ 371 (c)(1),
(2), (4) Date: Dec. 21, 2006

(87) PCT Pub. No.: WO2005/037453

PCT Pub. Date: Apr. 28, 2005

(65) Prior Publication Data

US 2007/0114158 A1    May 24, 2007

(30) Foreign Application Priority Data

Oct. 9, 2003    (EP)    .................................. 03078198

(51) Int. Cl.
*B65G 47/46* (2006.01)
(52) U.S. Cl. .................. 198/370.04; 198/384
(58) Field of Classification Search ............ 198/370.01, 198/370.04, 384, 385, 387; 209/912
See application file for complete search history.

(56) References Cited

U.S. PATENT DOCUMENTS

| | | | | |
|---|---|---|---|---|
| 5,244,100 A | * | 9/1993 | Regier et al. | 198/370.07 |
| 5,348,132 A | * | 9/1994 | Maier | 198/370.04 |
| 5,677,516 A | * | 10/1997 | Leverett | 198/370.04 |
| 5,901,854 A | * | 5/1999 | Ishii | 198/370.04 |
| 6,003,653 A | | 12/1999 | Kennedy et al. | |
| 6,374,983 B1 | * | 4/2002 | Morigi | 198/370.07 |

FOREIGN PATENT DOCUMENTS

| | | |
|---|---|---|
| AU | 701354 | 1/1999 |
| EP | 1 083 008 | 3/2001 |
| JP | 57-19222 | 2/1982 |
| WO | WO-2004/067417 | 8/2004 |

* cited by examiner

*Primary Examiner*—James R Bidwell
(74) *Attorney, Agent, or Firm*—Stites & Harbison PLLC; Marvin Petry

(57) ABSTRACT

An apparatus is provided for sorting products such as fruits. The apparatus comprises an endless conveyor and conveying units for conveying products behind each other in a substantially horizontal plane. Each conveying unit is formed by at least two rolling elements with the axes perpendicular to the conveying direction, a connecting element by which each rolling element is rotatably and vertically movably connected with the conveyor, and a carrier element arranged between the rolling elements, wherein at an inspection position, each product is situated on two successive rolling elements, and in a weighing position, each product is situated on the carrier element. A discharge guide comprises a leaf spring which has a rest position during conveyance and weighing, and a deflection position present only upon transition to and from a discharge position.

6 Claims, 5 Drawing Sheets

CARRIER FOR SORTING APPARATUS

Figure 1:
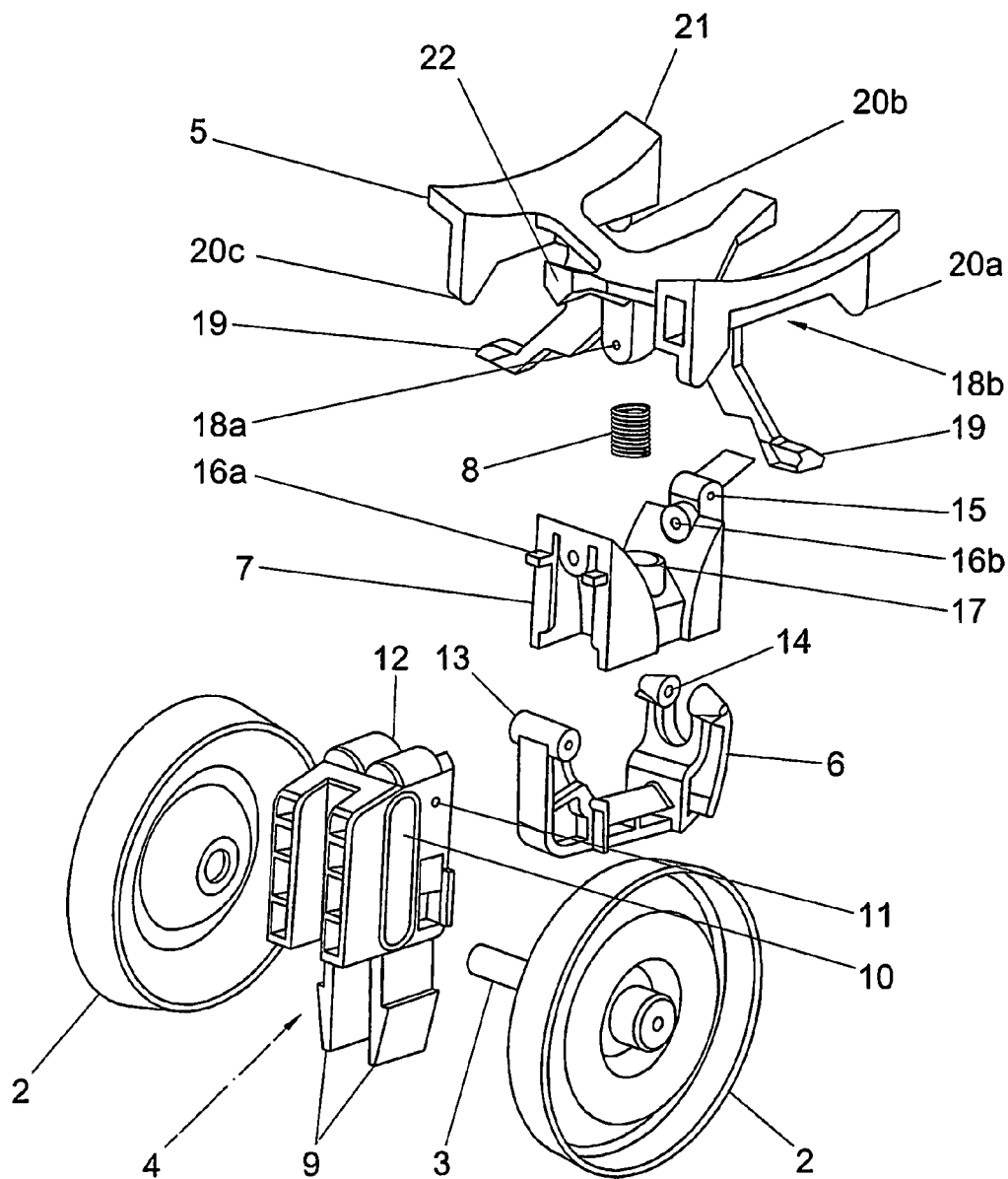

The present invention relates to an apparatus for sorting products, such as fruits, and, in particular, an apparatus for sorting and conveying a product in a substantially horizontal plane, one product behind the other.

Such an apparatus is largely known from, for instance, Australian patent No. 701,354. In EP-A-580,784, a sorting machine is described for products such as fruit, having mainly rolling elements with carrier-eject elements therebetween. The conveyor of this machine is an endless chain onto which components for conveying units are snap-fitted. In an assembly part, diabolo-like rolling elements are rotatable and displaceable in a vertical slotted hole, so that the products, with the rolling elements in a high position, rest only on the rolling elements and can rotate when, for instance, they are passed under or along an inspection camera. The carrier elements are likewise vertically displaceable, so that the products resting on them, at least during weighing, do not come into contact with the rollers. Additionally connected to the chain are laterally hinging and upwardly moving ejection brackets which lift the products laterally away from the carrier elements and thus push them, away therefrom, so that the products end up on the discharge devices.

Although such a machine provides for many needs, it has been found that during the sorting of several types of products, in particular fruits such as apples and citrus fruits, but also apricots, kiwis, plums, peaches, tomatoes, and the like, the dimensions of the components of conveying units need to be adapted, but also the sorting possibilities, more particularly the ejection possibilities, need to be broadened. Adapting a machine as described above, viz. adapting components at well-chosen positions, or providing exchangeable components, proves not to be possible or entails far too much expense.

In order to provide for such a need, the apparatus according to the present invention is characterized in that the discharge guide means only are in the discharge position when they are energized by energizing means.

In an advantageous manner, such discharge guide means provide for the tilting of carrier elements to both sides of the conveyor, and hence the discharge of products on both sides of the conveyor. Furthermore, this solution advantageously enables the sorting of a wider range of products. A further great advantage is that a carrier element automatically returns to the conveying position, so that fewer auxiliary means in the often very voluminous sorting machines will suffice.

A sorting machine for such sorting with discharge positions for the discharge guide means on both sides of the conveyor is known, for instance, from EP 675768. In this machine, each rolling element, that is, a diabolo-like roller, has its rolling shaft rotatably connected to a supporting bracket. This supporting bracket in turn is connected with a rectangular U-shaped bracket, viz. at the right-angled bent ends of the U-legs, and in this way is rotatable about an axis of the same direction as the rolling shaft. The base of this U-bracket is rotatably connected to a connecting element. The rolling shaft, the U-ends, and the connecting shaft have the same direction, viz. perpendicular to the conveying direction. In this construction, the combination of a single roller and the supporting bracket side located opposite thereto forms a carrier element during conveyance and weighing. The supporting bracket can tilt about the U-ends and the connecting shaft. In particular, the base of the U-bracket connected with the connecting element is rotatable, on the one hand in a first direction, viz. about an axis having the same direction as that of the shafts mentioned, and on the other hand in a second direction perpendicular thereto, that is, in the direction of the conveyor, and thereby tilting to one of the two sides. Upon tilting about the first direction, the rollers are displaced substantially vertically, and for instance moved up, so that the products rest on successive rollers and can be rotated for inspection purposes. In the second rotation direction, the combination of supporting bracket and roller will not only tilt laterally but also slide laterally over the connecting shaft. After discharge of a product in this way, this combination will have to be returned to the horizontal position using guide means, which must be considered a major disadvantage. In there Australian patent 701,354 the cup once tilted to a discharge position will have to be returned to the horizontal position as well.

In a further embodiment, the apparatus according to the invention is characterized in that the discharge guide means comprise a leaf spring, which leaf spring is in a rest position in case of conveyance and weighing, and has a deflection only upon movement to and from the discharge position, more particularly, that the leaf spring upon energization at discharge, from the rest position, undergoes deflections laterally and perpendicularly relative to the conveying direction, whereby the respective carrier element tilts laterally accordingly, and further, that the energizing means comprise raising guide elements, arranged on at least one of the sides of the conveyor, intended for guiding upwards and raising the side of the carrier element and thereby tilting the carrier element, whereby a product positioned on such carrier element is discharged on the side opposite the side mentioned.

In this manner, in a simple, but especially advantageous space-saving manner, a solution is offered for such a discharge guide means.

Figure 2:
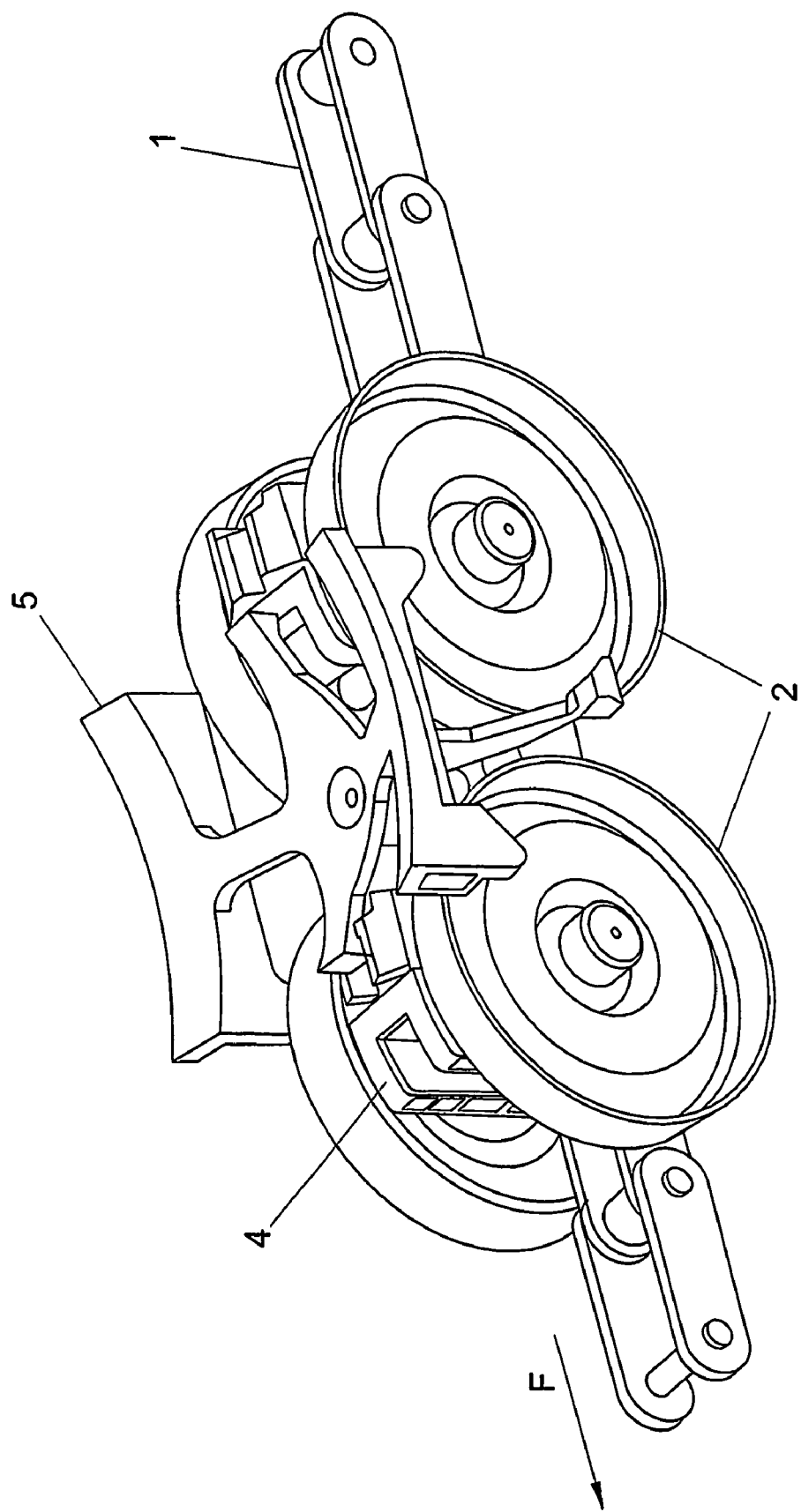
Figure 3:
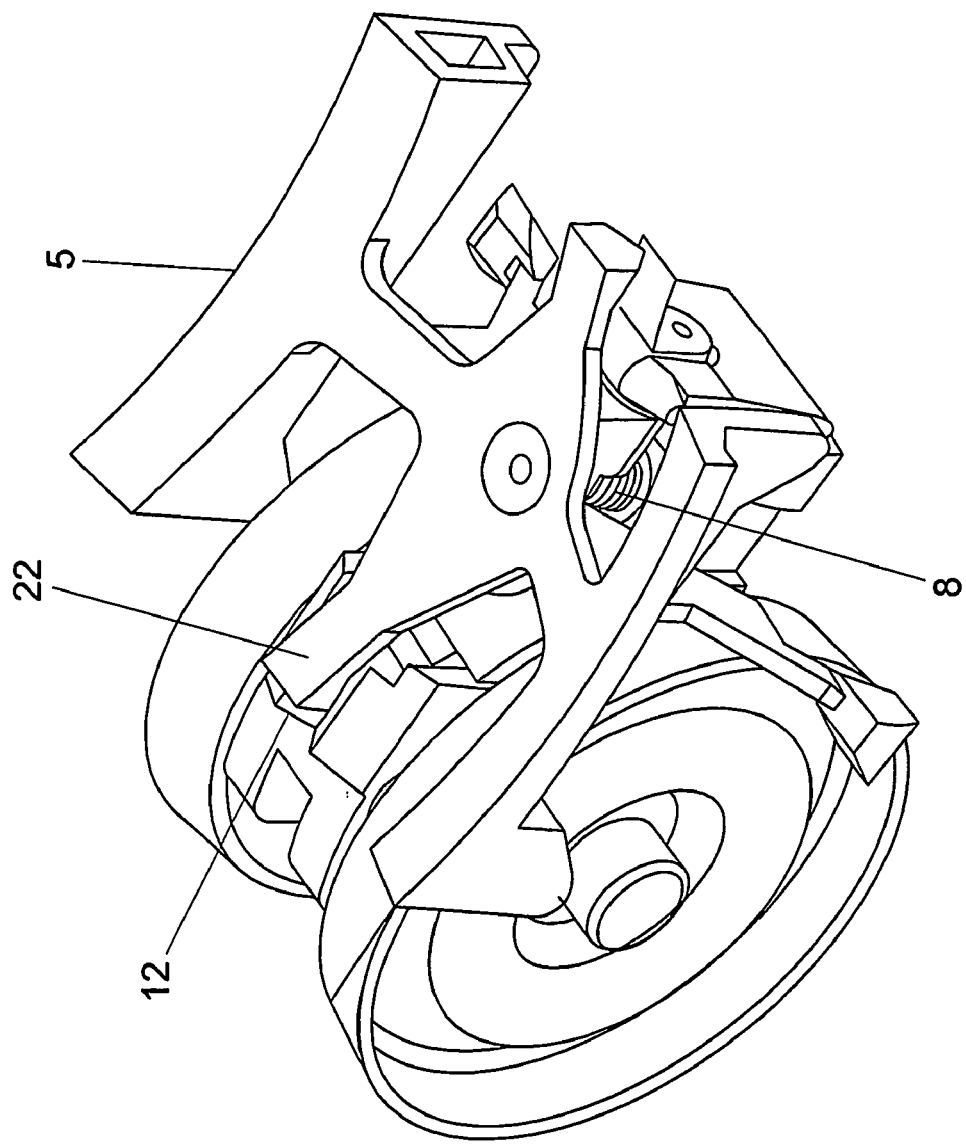
Figure 4:
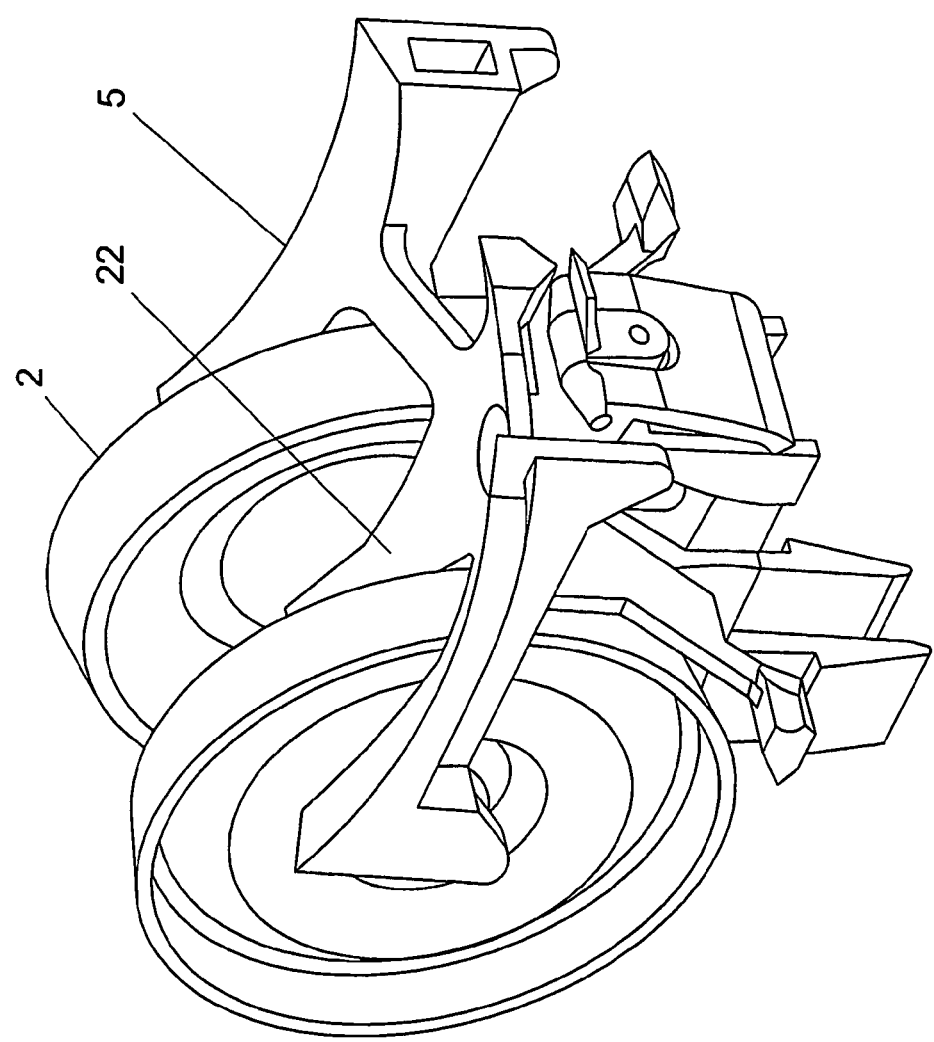
Figure 5:
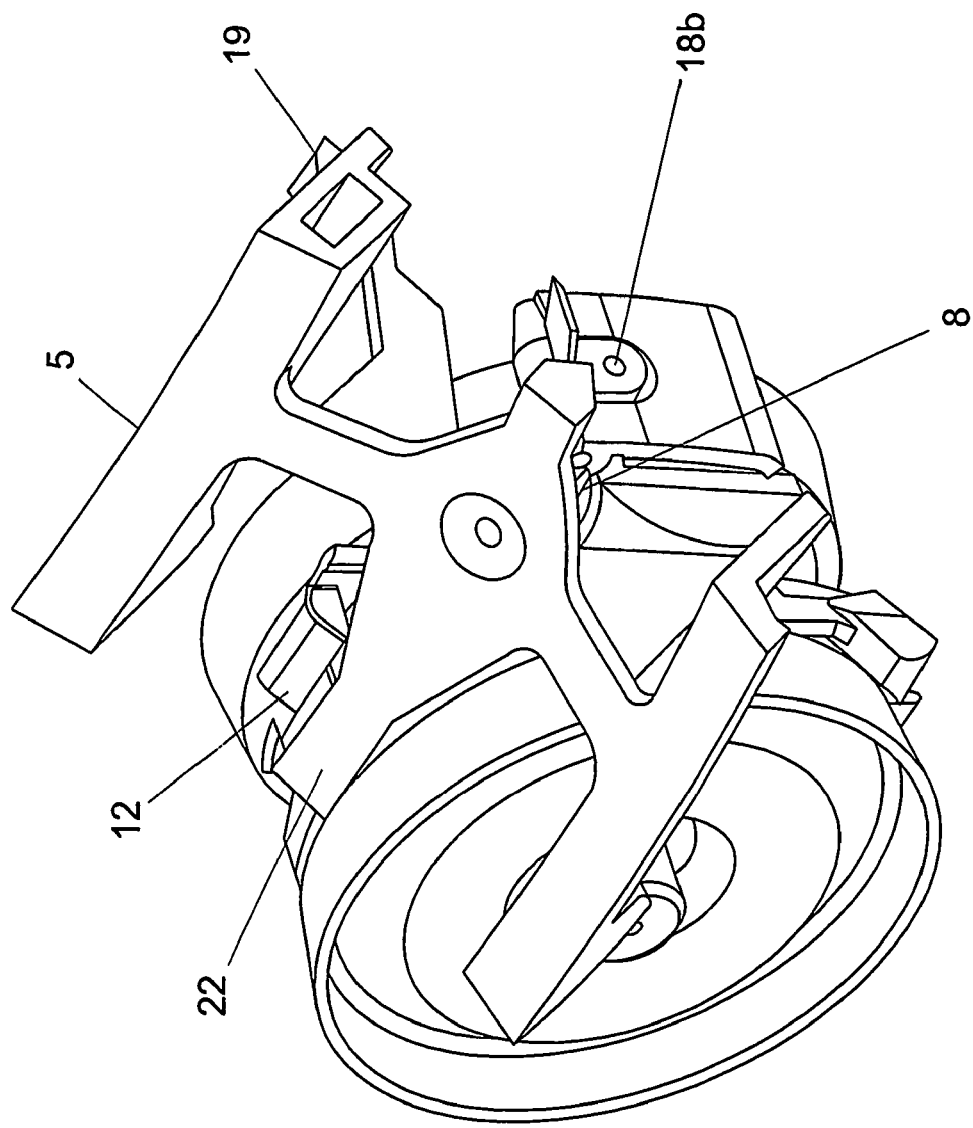

Further details and particular aspects of the apparatus according to the invention will be discussed and explained with reference to the accompanying drawings in which FIG. 1 shows the principal parts of the conveying unit in disassembled condition in isometric elevational view, FIG. 2 shows a single conveying unit attached to an endless chain, FIG. 3 shows the relative positioning of the carrier element and a single rolling element for the situation during conveyance, FIG. 4 shows the relative positioning of a carrier element and a single rolling element for the inspection position, and FIG. 5 shows the relative positioning of a carrier element and a single rolling element for the situation during discharge.

In FIGS. 1-5, same parts have the same reference numerals.

Referring to FIGS. 1 and 2, there is shown, in particular in FIG. 2, a single conveying unit according to the invention, this conveying unit being connected to a chain 1 which functions as an endless conveyor. In general, such a chain passes over gear wheels at both ends, of which, for instance, one is driven by a motor, and the plane in which the chain circulates is generally vertical. Mostly, several of such chains make up the main section of a sorting machine. It will be clear that such a sorting machine will contain hundreds of conveying units. The direction of travel of the chain 1 is indicated with an arrow F. The main parts of the unit are two rolling elements 2, here two pairs of wheels, with each pair connected by a shaft, a connecting element 4 by which the two rolling elements are connected to the chain 1, and a carrier element 5 on which the products are generally positioned. For the manner in which a carrier element is connected to the other parts, reference is made to the description of FIG. 1 hereinbelow. Furthermore, it is noted that a next unit in the row—not shown in the drawing—comprises a corresponding next pair of wheels with a carrier element therebetween. This means that each pair of wheels bounds two carrier elements, so that—as will be described hereinbelow—upon rotation each pair can in principle cause two products to rotate.

In FIG. 1, the principal parts which make up a conveying unit are shown separately in disassembled condition. The rolling elements 2 are formed by two wheels mounted on a shaft 3. By means of snap profiles 9, connecting element 4 can be snap-fitted onto the chain 1 described in relation to FIG. 2, more particularly so as to engage in the links of the chain. Furthermore, connecting element 4 possesses a vertically extending slotted hole 10 through which the shaft 3 extends and in which the shaft can be displaced vertically.

Carrier element 5 is movably and displaceably connected with the connecting element 4 by means of a first moving member 6 and a second moving member 7. More particularly, the members 6 and 7 function as hinging members for moving the carrier element 5 vertically to some extent. In detail, the different parts cooperate with each other as follows. By means of a pivot (not shown) through a pivot guide hole 11 in the connecting element 4 and through a first hinge pivot holder 13, the first moving member 6 is rotatably connected with the connecting element 4. With the aid of a next pivot (not shown) through a hinge connection pivot hole 14 in the first moving member 6 and through second hinge pivot holder 15 in the second moving member 7, the second moving member 7 is rotatable and vertically displaceable. It is noted that through the dimensioning of the members 6 and 7 the hinge action is such that the vertical movement that is needed to bring the carrier element in the weighing position is generally slight, more particularly a distance between 1 and 5 mm. To a person skilled in the art, it will be clear that the dimensioning has been chosen such that the little space available in such a conveying unit is optimally utilized. It is also noted that the pivots that connect connecting element 4 and the members 6 and 7 extend substantially horizontally and perpendicularly to the conveying direction F. Carrier element 5 and the second moving member 7 are likewise connected with pivots (not shown), viz. a first pivot through, on the one hand, a carrier element connection pivot hole 16a in member 7 and, on the other hand, a carrier element connection pivot holder 18a in the carrier element 5, and a second pivot in line therewith, with corresponding parts 16b and 18b, which latter part is designated in the drawing by just an arrow. As can be derived from the drawing, these pivots extend in the direction of the conveying direction F, thereby enabling tilting to both sides laterally of the conveying direction F. This means that the discharge of products from such a carrier element can take place on both sides.

FIG. 1 shows further particulars of the carrier element 5, it being noted that the shape of the product-carrying part is substantially cup-shaped so as to conform as much as possible to products such as fruits, and to avoid damages in this way. More particularly, the product-carrying part is fork-shaped, with a transverse portion and pins 21 connected thereto in the longitudinal direction of the conveyor, while recesses between the pins 21 can accommodate the further parts of such a conveying unit, such as the wheels of the rolling elements 2. More in detail, the pin in the middle has a tip 22, viz. a thickened portion, which fits into a pocket 12 of the connecting element 4. It will be clear to anyone skilled in the art that in this way, possible lateral movements of the carrier element 5 during conveyance, for instance owing to products not resting entirely still on the carrier element, are obviated. Further, it will be elucidated hereinafter that by the use of these fitting means a carrier element and a connecting element are suitably fixed relative to each other in this way.

As further indicated in FIG. 1, at the undersides of the pins, on the sides of the carrier element 5, there are weighing guides 20a, b, c, with which the carrier element 5 is passed over a load cell. In the exemplary embodiment shown, three guides are indicated for a so-called three-point weighing, but it will be clear to anyone skilled in the art that other configurations are also possible. As already indicated hereinabove, a carrier element 5 is moved upwards to some extent to be subsequently drawn over a load cell. The combination of moving members or hinging members 6 and 7 serves specifically to eliminate vertical moments resulting from vertical force components. For guiding such weighing guides 20a, b, c upwards, many solutions are known in this technical field, generally involving the use of guide profiles on opposite sides of the conveyor chain.

To enable such a carrier element 5 to be tilted to one side or the other, each carrier element 5 is provided on both sides with a raising guide leg 19. Guide profiles for this purpose on a single side or on both sides, which can be moved into the guide path, are well known. Upon such tilting, such a carrier element 5 rotates about the above-mentioned pivots which are arranged in the combination of parts 16a, 18a, 16b, 18b. In order to keep such a carrier element 5 in the usual horizontal position for conveyance, a leaf spring 8 is used. In the exemplary embodiment represented, a spiral spring is used which, in the present application, is bent laterally upon tilting. This leaf spring is arranged between an annular holder 17 in the second moving member or second hinging member 7 and a similar holder at the underside of the carrier element between the carrier element connection pivot holders 18a and 18b. The spiral spring used will generally extend in slightly compressed condition between these holders to thereby prevent unwanted vibrations, wear due to play, or also other unwanted disadvantages. Upon energization, that is, upon positioning of a profile in the raising path for guiding the raising guide leg 19 upwards, a lateral deflection from the vertical rest position is imparted to the leaf spring 8. After tilting of the carrier element 5, and the subsequent discharge of a product carried along, the profile is retracted so that the carrier element 5, under the action of the leaf spring returning to the rest position, resumes its original position, that is, the position during horizontal conveyance. Accordingly, this does not require any extra measures, such as return guide profiles. For anyone skilled in the art, it will be clear that such a spiral spring does not necessarily need to be biased to act as a leaf spring. Moreover, other techniques can be applied to effect automatic return to the original position after tilting, which applications can be summarized as discharge guide means, and can involve, for instance, the use of electromagnets, or combinations thereof.

FIGS. 3, 4 and 5, to be discussed below, respectively represent, in each case for a single rolling element 2 and a single carrier element 5, successive positions for conveyance T, rotation R, and tilting and discharge D. In FIG. 3, for the purpose of conveyance T, it is clearly shown how tip 22 rests in pocket 12, in which case the hinging members 6 and 7 will not be 'hinged out', that is, slightly rotated and vertically displaced. FIG. 5 represents the situation as described in detail above for tilting and discharge D. It is shown that tip 22 and pocket 12 have been rotated away from each other, which rotation has taken place about the above-mentioned pivots, in which connection the elevation of FIG. 5 shows carrier element connection pivot holder 18b. In this situation, leaf spring 8 has obtained a deflection relative to the vertical rest position. In FIG. 4, rolling element 2 is shown in a high position, which position is reached by raising such a rolling element 2 in a slotted hole 4. To raise an element for such a purpose is well known. In the situation represented, a carrier element will have tip 22 resting in a pocket 12, but the distance between successive rolling elements 2 has been chosen such that a product resting on an intermediate carrier element 5 is raised along with the rollers, whereby the rotating rolling elements 2 will carry the products along in their rotation. The rotation of products is carried out in a known manner to be able to observe all sides of a rotated product and, if necessary, to image them, thereby enabling inspection and selection during sorting. Such techniques are also well known.

Further, it is to be noted that in general, both during weighing and conveyance, the products rest only on the carrier elements 5, while the dimensions of the constituent parts have been chosen such that a sorting machine provided with conveying units according to this invention are suitable for sorting products of widely diverging dimensions, more particularly of diameters between roughly 30 mm and 150 mm. Also, the dimensioning has been chosen such that the conveying units fit onto several types of chains. This means in particular that shaped connecting elements are provided symmetrically, while the dimensioning of the other parts has remained the same. Also, the carrier elements can be arranged rotated through 180°.

Further small modifications are understood to fall within the scope of protection of the appended claims.

The invention claimed is:

1. An apparatus for sorting products, the apparatus comprising:
   an endless conveyor;
   conveying units for conveying the products, all one behind the other in a conveying direction and situated in a substantially horizontal plane, each one of the conveying units connected with the endless conveyor, and each one of the conveying units conveying a single product,
   each conveying unit comprising:
      at least two rolling elements with the axes perpendicular to the conveying direction;
      a connecting element by which each rolling element is rotatably and vertically movably connected with the conveyor; and
      a respective carrier element arranged between the rolling elements,
   wherein, while at least in an inspection position, each product is situated on two successive rolling elements and
   in a weighing position, each product is situated on one of the carrier and
   each carrier element is connected with moving means for moving the carrier element to and from the weighing position, and each carrier is provided with discharge guide means for the transition of a respective carrier element to and from a discharge position for laterally discharging the product onto an output apparatus, wherein discharge positions for lateral discharge are provided on both sides of the conveyor;
   the discharge guide means only being in the discharge position when the discharge guide means are energized by energizing means, and the respective carriers automatically return to the conveying positions after the discharge guide means are no longer energized.

2. The apparatus according to claim 1, wherein the discharge guide means comprise a leaf spring, the leaf spring having a rest position in the case of conveyance and weighing, and a deflection position, only upon movement to and from the discharge position.

3. The apparatus according to claim 2, wherein the leaf spring, upon energization at discharge from said rest position, undergoes deflections, lateral and perpendicular relative to the conveying direction, whereby the respective carrier element tilts laterally accordingly.

4. The apparatus according to claim 1, wherein the energizing means comprise raising guide means, arranged on at least one of the sides of the conveyor, intended for guiding upwards and raising said side of the carrier element and thereby tilting the carrier element, whereby a product situated on such a carrier element is discharged on the side other than said side.

5. The apparatus according to claim 1, wherein the moving means comprise two hinging members.

6. The apparatus according to claim 1, wherein a carrier element and a connecting element each comprise a fitting part so that both elements are fixed in the weighing position and in the conveyance position.

* * * * *